United States Patent
Jajodia et al.

(10) Patent No.: US 7,904,962 B1
(45) Date of Patent: Mar. 8, 2011

(54) NETWORK ATTACK MODELING, ANALYSIS, AND RESPONSE

(75) Inventors: Sushil Jajodia, Oakton, VA (US); Steven E. Noel, Dale City, VA (US); Pramod Kalapa, Vienna, VA (US); Brian C. O'Berry, North Potomac, MD (US); Michael A. Jacobs, Tulsa, OK (US); Eric B. Robertson, Vienna, VA (US); Robert G. Weierbach, Arlington, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 987 days.

(21) Appl. No.: 11/371,937

(22) Filed: Mar. 10, 2006

Related U.S. Application Data (60) Provisional application No. 60/659,897, filed on Mar. 10, 2005, provisional application No. 60/659,896, filed on Mar. 10, 2005, provisional application No. 60/659,890, filed on Mar. 10, 2005.

(51) Int. Cl.
G06F 12/14 (2006.01)
G06F 12/16 (2006.01)
(52) U.S. Cl. .............. 726/25; 726/22; 726/23; 726/24; 709/223; 709/224
(58) Field of Classification Search .......... 726/22–25; 709/223–224
See application file for complete search history.

(56) References Cited

U.S. PATENT DOCUMENTS
| | | | |
|---|---|---|---|
| 5,721,931 A * | 2/1998 | Gephardt et al. | 710/260 |
| 7,013,395 B1 * | 3/2006 | Swiler et al. | 726/25 |
| 7,073,198 B1 * | 7/2006 | Flowers et al. | 726/25 |
| 2006/0070128 A1 * | 3/2006 | Heimerdinger et al. | 726/23 |

OTHER PUBLICATIONS

Scalable, Graph-Based Network Vulnerability Analysis by Ammann et al; Date: Nov. 2002; Publisher: ACM.*
Efficient Minimum-Cost Network Hardening Via Exploit Dependency Graphs by Noel et al; Year:2003; Publisher: IEEE.*
Experimenting with Quantitative Evaluation Tools for Monitoring Operational Security by Ortalo et al; Year: 1999; Publisher: IEEE.*
Representing TCP/IP connectivity for topological analysis of network security by Ritchey et al; Year: 2002; Publisher: IEEE.*
Constructing Attack Scenarios through Correlation of Intrusion Alerts by Ning et al; Date: Nov. 2002; Publisher: ACM.*
Topological Analysis of Network Attack Vulnerability by Jajodia et al; Date: Nov. 3, 2003; Publisher: CiteSeerX.*

* cited by examiner

*Primary Examiner* — Taghi T Arani
*Assistant Examiner* — Madhuri Herzog
(74) *Attorney, Agent, or Firm* — David G. Grossman; Edgar G. Rodriguez (57) ABSTRACT

Disclosed is a system for modeling, analyzing, and responding to network attacks. Machines are mapped to components, components are mapped to vulnerabilities, and vulnerabilities are mapped to exploits. Each of the exploits includes at least one precondition mapped to at least one postcondition. An attack graph which defines inter-exploit distances is generated using at least one of the exploits. The attack graph is aggregated. At least one hardening option is determined using the aggregated attack graph. Hardening options include applying at least one corrective measure to at least one initial condition, where the initial condition is the initial state of a precondition.

20 Claims, 11 Drawing Sheets

| Exploit | Description | Preconditions | Postconditions |
|---|---|---|---|
| IISRDS | One of many exploits associated with Microsoft's Internet Information Server (IIS) | 1. Execute access on attack machine. 2. Attack machine has connectivity to IIS service on victim. | Ability to execute programs on victim at super user privilege level |
| RCPDOWNLOAD | Binds rsh access to the ability to transfer programs (e.g., rootkits) from victim machine using the rcp program | 1. Execute access on attack machine 2. rcp program on attack machine 3. Attack machine has connectivity to victim's rsh service | Copies victim machine's programs to attack machine |
| WUFTPDX | Yields super user on many Unix platforms that run the Washington University FTP daemon, wu-ftpd | 1. Execute access on attack machine 2. wu-ftpd exploit program exists on attack machine 3. Attack machine has connectivity to FTP service on victim | Super user execute access on victim |
| PORTFORWARD | Enables attacker to work around firewall when foothold obtained on an internal machine. One of few exploits that implements "middleman" machine to direct exploits against victim machine | 1. Middleman and victim are different machines (implicit, not in attack graph) 2. Execute access on middleman 3. Port-forwarding program on middleman 4. Attacker connectivity to transport-layer (unused) port on middleman | Attacker acquires middleman's transport layer connectivity to victim |

FIG. 11

NETWORK ATTACK MODELING, ANALYSIS, AND RESPONSE

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of: Contract No. F30602-00-2-0512 awarded by the Air Force Research Laboratory, Rome; Grant No. DAAD19-03-1-0257 awarded by the Army Research Office; and Contract No. W911QX-04-C-0101 awarded by the Army Research Laboratory.

CROSS-REFERENCES TO RELATED APPLICATIONS

This application claims the benefit of U.S. Provisional Application No. 60/659,896, to Jajodia et al., filed Mar. 10, 2005, and entitled "Network Attack Modeling, Analysis, and Response;" U.S. Provisional Application No. 60/659,890, to Noel et al., filed Mar. 10, 2005, and entitled "Attack Graph Aggregation;" and U.S. Provisional Application No. 60/659,897, to Noel et al., filed Mar. 10, 2005, and entitled "Correlating Intrusion Events Using Attack Graph Distances" which are all hereby incorporated in whole by reference.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF EMBODIMENTS

The present system is an integrated, topological approach to network vulnerability analysis for helping to understand overall vulnerability to network attacks by considering attacker exploits not just in isolation, but also in combination. It automates the labor-intensive type of analysis usually performed by penetration-testing experts, and is ideal for inexpensive what-if analyses of the impact of various network configurations on overall network security. This system includes modeling of network security conditions and attack techniques (exploits), automatic population of models via a network vulnerability scanner, and analysis of exploit sequences (attack paths) leading to specific attack goals.

Modeling of network vulnerabilities includes the selective application of corrective measures such as software patches or disabling network services. The system generates a graph of dependencies among exploits that attempts to represent all possible attack paths without having to enumerate them. This representation enables highly scalable methods of vulnerability analysis, such as computing network configurations that guarantee the security of given network resources. Attack paths (combinations of exploits) are computed, from which one can decide whether a given set of network hardening measures guarantees the safety of given critical resources. This system can then go beyond attack paths to compute actual sets of hardening measures (assignments of initial network conditions) that attempt to guarantee the safety of given critical resources. Moreover, for given costs associated with individual hardening measures, assignments that minimize overall cost may be computed. By doing minimization at the level of initial conditions rather than exploits, hardening irrelevancies and redundancies may be resolved in a way that cannot be done through previously proposed exploit-level approaches. Preferably, the use of an efficient exploit-dependency representation may be used that has polynomial complexity, as opposed to many previous attack graph representations having exponential complexity.

The framework can manage network attack graph complexity through interactive visualization, which includes hierarchical aggregation of graph elements. Aggregation collapses non-overlapping subgraphs of the attack graph to single graph vertices, providing compression of attack graph complexity. The aggregation is recursive (nested), according to a predefined aggregation hierarchy. This hierarchy establishes rules at each level of aggregation, with the rules being based on either common attribute values of attack graph elements or attack graph connectedness. The higher levels of the aggregation hierarchy correspond to higher levels of abstraction, providing progressively summarized visual overviews of the attack graph. Also disclosed are rich visual representations that capture relationships among the semantically-relevant attack graph abstractions, and views that support mixtures of elements at all levels of the aggregation hierarchy. While it would be possible to allow arbitrary nested aggregation of graph elements, it may be better to constrain aggregation according to the semantics of the network attack problem, i.e., according to the aggregation hierarchy. The aggregation hierarchy also makes efficient automatic aggregation possible.

Introduced is the novel abstraction of protection domain as a level of the aggregation hierarchy, which corresponds to a fully-connected subgraph (clique) of the attack graph. Expensive detection of attack graph cliques is avoided through knowledge of the network configuration, i.e., protection domains are predefined. Aggregation can occur simultaneously with attack graph construction, so that the complexity of non-aggregated attack graphs is avoided throughout processing.

This system manages attack graph complexity for interactive visualization. Overall, computation in this framework has worst-case quadratic complexity, but in practice complexity is greatly reduced because users generally interact with (often negligible) subsets of the attack graph. Intrusion events may be mapped to known exploits in the network attack graph, and correlate the events through the corresponding inter-exploit distances. Here, "inter-exploit" distances means the shortest-path distances between pairs of exploits in the attack graph. Computing these shortest-path distances may be implemented using an "all-pairs shortest path" algorithm, which has quadratic complexity. From these inter-exploit distances, coordinated attacks may be constructed, and scores provided for the degree of causal correlation between their constituent events, as well as an overall relevancy score for each scenario.

The system treats intrusion event correlation and coordinated-attack construction based on association with vulnerability-based attack graphs. The disclosed invention handles missed detections through the analysis of network vulnerability dependencies, unlike previous approaches that infer hypothetical attacks. In particular, lack of knowledge through inter-exploit distances may be quantified. Low-pass signal filtering of event correlation sequences improves results in the face of erroneous detections. A correlation threshold may be applied for creating strongly correlated coordinated attacks. This model may be highly efficient because attack graphs and their exploit distances may be computed offline. Online event processing may then only require a database lookup and a small number of arithmetic operations, making the approach feasible for real-time applications.

There are a number of tools available that can scan a network for known vulnerabilities. But such tools consider vulnerabilities in isolation, independent of one another. Unfortunately, the interdependency of vulnerabilities and the connectivity of networks make such analysis limited. While a single vulnerability may not appear to pose a significant threat, a combination of such vulnerabilities may allow attackers to reach critical network resources.

Currently available tools generally give few clues as to how attackers might actually exploit combinations of vulnerabilities among multiple hosts to advance an attack on a network. After separating true vulnerabilities from false alarms, the security analyst is still left with just a set of known vulnerabilities. It can be difficult even for experienced analysts to recognize how an attacker might combine individual vulnerabilities to seriously compromise a network. For larger networks, the number of possible vulnerability combinations to consider can be overwhelming.

The presently described tool implements a powerful topological approach to global network vulnerability analysis. This Topological Vulnerability Analysis (TVA) tool considers combinations of modeled attacker exploits on a network and then discovers attack paths (sequences of exploits) leading to specific network targets. The discovered attack paths allow an assessment of the true vulnerability of critical network resources. TVA automates the type of labor-intensive analysis usually performed by penetration-testing experts. Moreover, it encourages inexpensive "what-if" analyses, in which candidate network configurations are tested for overall impact on network security.

In implementing TVA, extensive information about known vulnerabilities and attack techniques may be collected. From this vulnerability/exploit database, a comprehensive rule base of exploits may be built, with vulnerabilities and other network security conditions as exploit preconditions and postconditions.

In the network discovery phase of TVA, network vulnerability information may be automatically gathered and correlated with the exploit rule base. In the analysis phase, the resulting network attack model may be submitted to a custom analysis engine. This engine preferably models network attack behavior based on exploit rules and builds a graph of precondition/postcondition dependencies among exploits. The result is a set of attack paths leading from the initial network state to a pre-determined attack goal.

Network Attack Problem: Analyzing how attackers can combine low-level vulnerabilities to meet overall attack goals is a complex problem. Solving this problem involves modeling networks in terms of their security conditions, modeling atomic attacker exploits as transition rules among security conditions, and computing combinations of atomic exploits that lead to given network resources.

In this problem, the various security conditions $a_i$ of a network may be modeled as binary variables. In particular, the values model the conditions necessary for the attacker's success. For example, if some $a_i$ represents a vulnerable version of a particular software component, $a_i=1$ means the component exists and $a_i=0$ means it does not. Under an assumption of monotonicity, a condition may transition from false to true but not back to false. That is, once a condition contributes to the success of an attack, it will always do so.

Next, the success of some attacker exploit $s_j=s_j(a_{i_1}, a_{i_2}, \ldots, a_{i_k})$ may be modeled as a Boolean function of some set of conditions. For simplicity and without loss of generality, we model $s_j$ as a conjunction, i.e., $s_j(a_{i_1}, a_{i_2}, \ldots, a_{i_k}) = a_{i_k} = a_{i_1} \wedge a_{i_2} \wedge \ldots \wedge a_{i_k}$. If an exploit involves disjunction (e.g. more than one version of a vulnerable program), one may simply divide the disjunctive portions into separate conjunctive exploits. The success of an exploit $s_j$ then induces some set of new conditions to become true, i.e., $s_j(a_{i_1}, a_{i_2}, \ldots, a_{i_k})=1$ implies $a_{p_1}=1, a_{p_2}=1, \ldots, a_{p_q}=1$. In other words, $s_j$ is a mapping from $s_j^{pre}=\{a_{i_1}, a_{i_2}, \ldots, a_{i_k}\}$ ($s_j$'s preconditions) to $s_j^{post}=\{a_{p_1}, a_{p_2}, \ldots, a_{p_q}\}$ ($s_j$'s postconditions) such that if all the preconditions in $s_j^{pre}$ are true then all the preconditions in $s_j^{post}$ become true.

Given a network attack model, the next step may be to determine how the application of exploits (in terms of security conditions) impacts network vulnerability. This step involves discovering combinations of exploits that lead to the compromise of a given critical resource. That is, some security condition $a_{goal}$ could be designated as the goal of the attack. An attack path is then a sequence of exploits $s_{j_1}, s_{j_2}, \ldots, s_{j_l}$ that leads to $a_{goal}$ becoming true. Of particular interest are minimal attack paths, such that all exploits in the path are necessary for achieving the attack goal.

Attack paths can help network administrators determine the best way to harden their networks. To ensure complete security, all attack paths must be accounted for. Some approaches in the literature do not report all paths, while other approaches explicitly enumerate all of them. For scalability, what is needed is a representation that allows the (implicit) analysis of all possible attack paths without explicitly enumerating them. For example, in terms of network hardening, it is sufficient to know that a particular exploit is required for all possible paths, without explicitly generating all of them.

In network hardening, it is also necessary to distinguish between two types of network security conditions. One type appears only as exploit preconditions. The only way that such conditions can be true is if they are true in the initial network conditions, since they are postconditions of no exploit. These initial conditions are precisely the ones that should be considered for network-hardening measures. The other type of condition appears as both exploit preconditions and postconditions. Such conditions may be safely disregarded for network hardening, since attacker exploits can potentially make them true despite hardening measures.

Given a set of initial conditions $A_{init}=\{c_1, c_2, \ldots, c_k\}$, assignments of condition values (hardening measures) in $A_{init}$ may be computed that guarantee the safety of a set of goal conditions $A_{goal}=\{g_1, g_2, \ldots, g_p\}$, i.e., $a_{goal_i}=0$, $\forall i$. Moreover, it may be preferable to compute hardening measures that minimize assignments of $c_i=0$, since such assignments generally have some cost associated with them, e.g., the application of a security patch or the disabling of a service.

Description of TVA Tool for analyzing vulnerability to network attacks: This description includes the modeling of network attacks and the analysis of network attack models for discovering attack paths to given critical resources.

Figure 1:
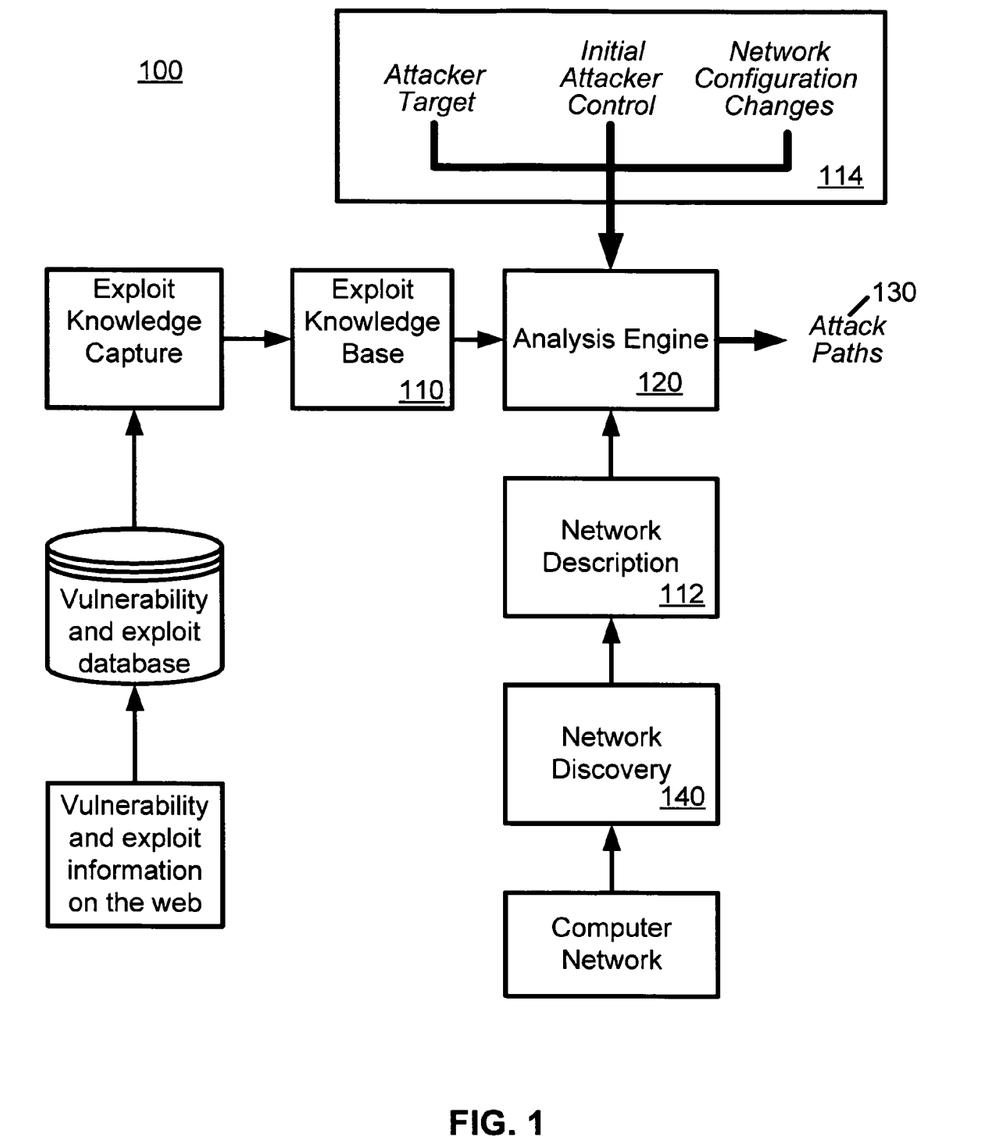
FIG. 1 is an example diagram of a topological vulnerability analysis architecture as per an aspect of an embodiment of the present invention.

FIG. 1 shows the overall architecture 100 of the TVA tool. There are three components: (1) a knowledge base of modeled exploits 110, (2) a description of a network of interest 112, and (3) a specification of an attack scenario 114 (attacker target, initial attack control, and network configuration changes). The TVA analysis engine 120 merges these three components and then discovers attack paths 130 (exploit combinations) based on the merged model.

Exploits may be modeled in terms of their preconditions and postconditions. That is, each exploit is a rule in which the occurrence of a particular set of preconditions induces a particular set of postconditions. The resulting set of exploit rules comprises an attack knowledge base. The exploits in the knowledge base are generic, i.e., independent of any particular network.

A network discovery component 140 gathers configuration and connectivity information to produce a TVA network description 112. Here the term "network discovery" is used in a more general sense, i.e., it may include traditional network discovery tools, vulnerability scanners, and code to convert such tool outputs to a TVA network description. The network description 112 and exploit knowledge base 110 share a common name space, which enables the mapping of generic exploits to actual network elements.

Modeling Network Attacks: Keeping pace with evolving threats and vulnerabilities requires an on-going effort in collecting information on network attacks that can be leveraged for TVA. The set of exploit rules in the TVA knowledge base should be comprehensive and up to date, since discovered attack paths will contain only those exploits that are actually included in the knowledge base 110.

Once raw information related to network attacks is gathered, they may be modeled it in terms of exploit preconditions/postconditions. For comprehensive and accurate results, this modeling may require a good understanding of attacker strategies, techniques, and tool capabilities. Exploit conditions can be any generic attributes that potentially impact network security.

The TVA model structure is a hierarchical framework that serves as a taxonomy of model elements. The TVA model structure evolved as exploits were developed for various types of vulnerabilities. The evolving structure supports the effects of firewalls and other connectivity-related devices. Also important is the modeling of machine groups, such that a successful attack against one group member applies equally to other machines in the group.

Figure 2:
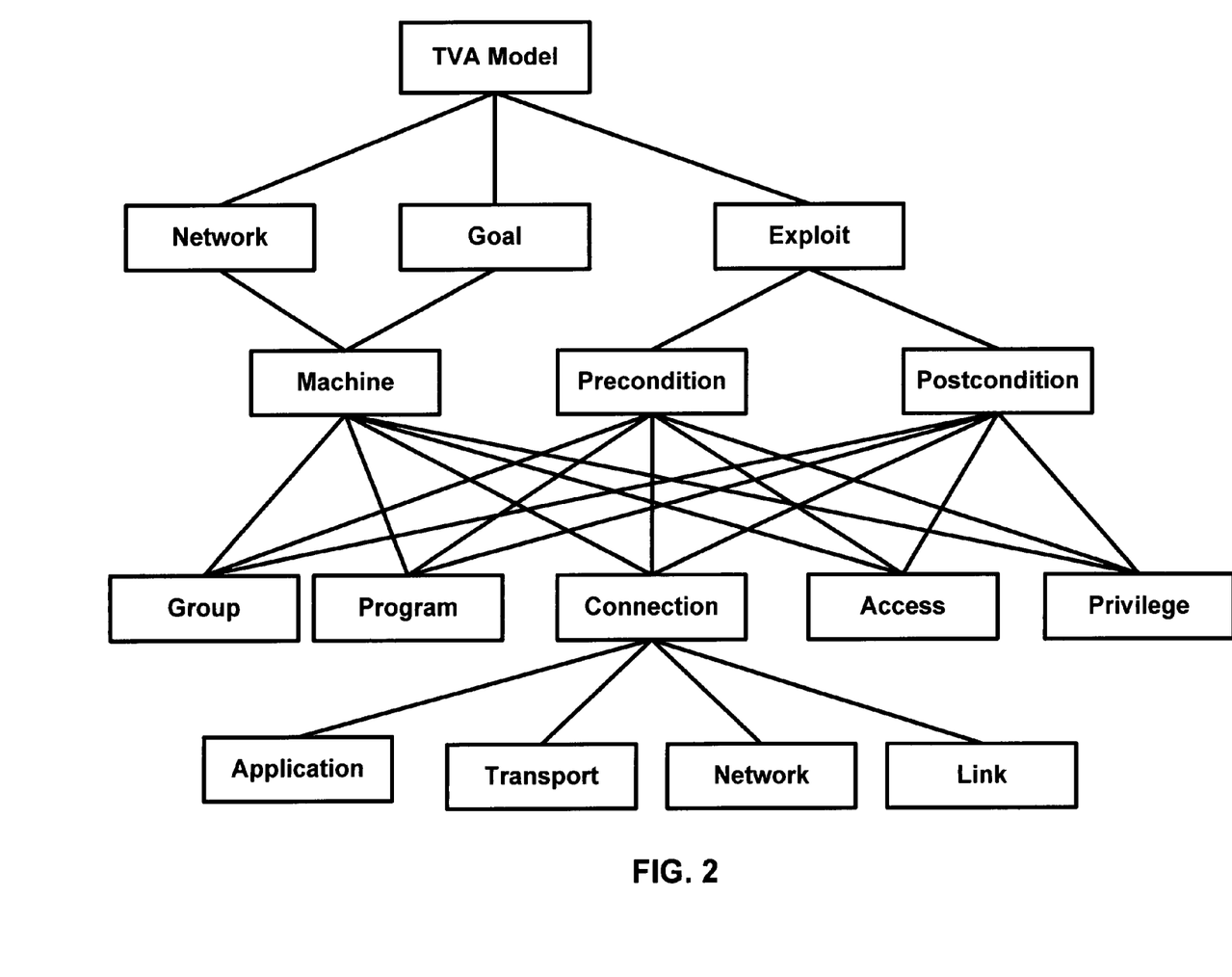
FIG. 2 is an example diagram of a topological vulnerability analysis model as per an aspect of an embodiment of the present invention.

The TVA model structure in FIG. 2 should be flexible enough to address a full range of vulnerability types and network configuration variations. For example, exploit rules for traffic sniffing, password capturing and cracking, file transfers, command shell access, X Window access, secure shell (ssh) public key authentication, buffer overflows that grant elevated user privileges, port forwarding, machine identity spoofing, and denial-of-service attacks may be implemented.

In the next paragraph, a way to automatically populate network models for TVA is described. However, it may be much more difficult to automatically populate sets of modeled exploits. In particular, it may be difficult to automatically capture the semantics needed for exploit preconditions and postconditions, because the vulnerability-reporting community has defined no standard formal language for specifying such semantics. Instead, databases of reported vulnerabilities usually rely on natural language text to describe vulnerabilities and ways of exploiting them. One may want to investigate how exploit semantics can be specified via web-based ontologies.

For TVA to be practical for real networks, it can be important to automate the network discovery process. One way to do this is to integrated the TVA tool with a vulnerability scanner such as the open-source Nessus vulnerability available from Tenable Network Security, Inc. in Columbia, Md. Nessus maps known vulnerabilities to network machines, reporting scan results using the eXtensible Markup Language (XML). The XML representation allows for leveraging the eXtensible Stylesheet Language (XSL) to easily convert Nessus output to TVA input (which is also in XML).

To transform a vulnerability report into a TVA network description, each reported vulnerability may be cross-referenced against a list of known exploits. If a match is found, the vulnerability may be applied as the name of a machine-connection precondition in the resulting network description. Exploits may also have preconditions and/or postconditions for access type (e.g., execute or file transfer access) and privilege level (e.g., user or super user).

TVA maintains network connectivity details in separate tables that describe each machine's connections to the rest of the network. This means that firewalls don't have to be modeled directly because the individual host tables implicitly address their effects. However, multiple vulnerability scans may be required to correctly populate the connectivity tables when firewalls are present. In general, a separate vulnerability scan may be required for each network segment to which a firewall connects.

Figure 3:
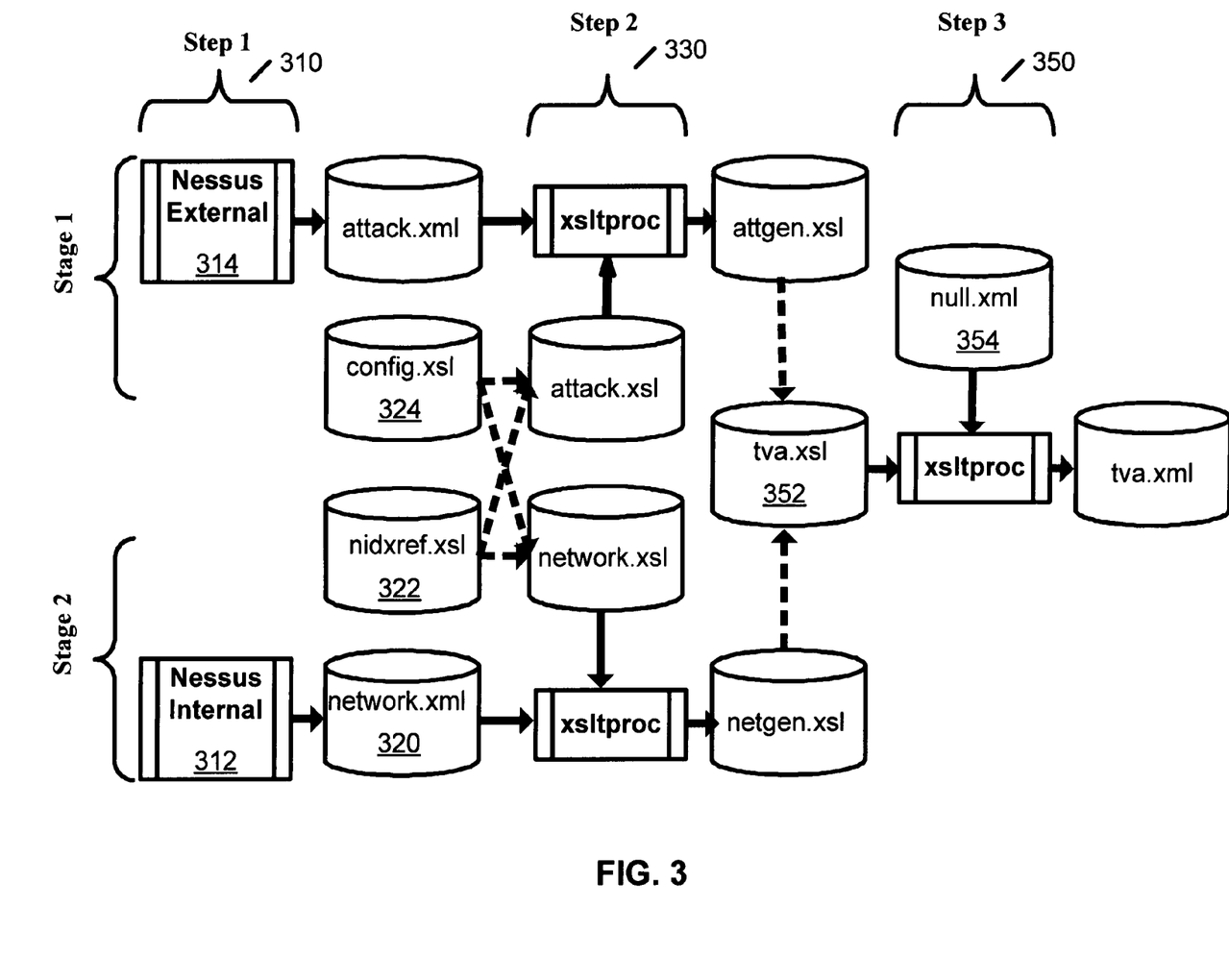
FIG. 3 is an example diagram showing the generation of a network description using a vulnerability scanner as per an aspect of an embodiment of the present invention.

The network generation process may merge the external vulnerability scans 314 and internal vulnerability scans 312 into a single coherent network description. The two-stage (external and internal) dataflow diagram for this process is shown in FIG. 3. This process can be generalized in a straightforward fashion to handle arbitrary numbers of separate network segments.

In the first step of this process 310, Nessus (or other vulnerability scanner) generates a vulnerability report 320 for each network segment. In the second step 330, the Nessus report XML 320 is processed against a Nessus cross-reference 322 (nidxref.xsl), written in XSL. The second step optionally inserts configuration-specific information 324 (contained in config.xsl) as specified by the TVA user. The nidxref.xsl 322 stylesheet is produced by the Nessus exploit generation process described below. This stylesheet enables the network description to be optimized so that it contains only those Nessus connections for which exploits have been developed.

The last step 350 merges the intermediate files from the second step into a single network description (tva.xsl) 352 that also incorporates an attack goal specification from the TVA user. The null.xml 354 document is a dummy file that satisfies the XSL processor requirement for an input XML file.

Figure 4:
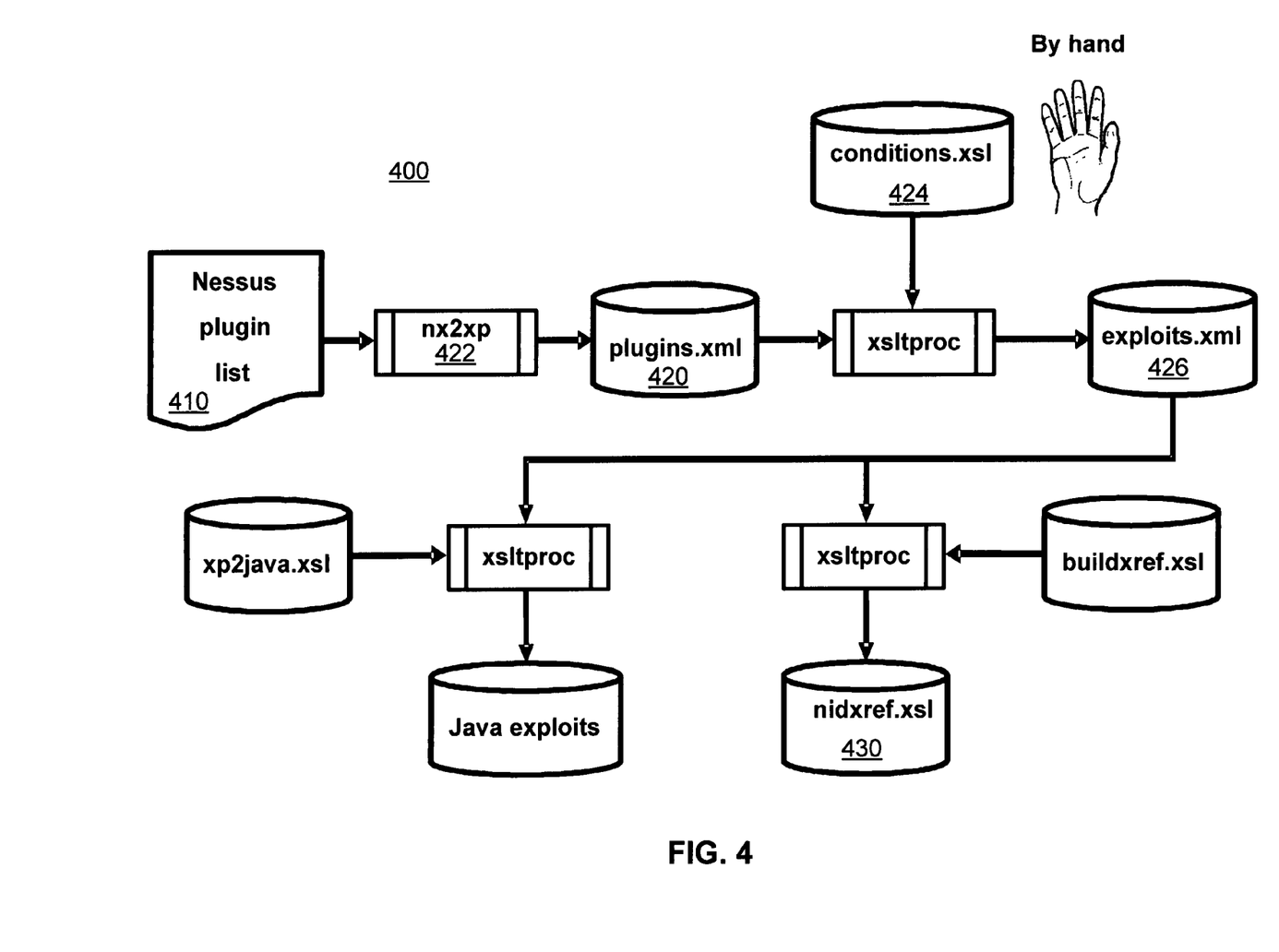
FIG. 4 is an example diagram showing the generation of network exploits as per an aspect of an embodiment of the present invention.

The process for generating TVA exploits 400 from Nessus is shown in FIG. 4. The process may begin with Nessus plugins 420, which contain the detailed information that Nessus needs for detecting vulnerabilities. A program 422 (np2xp) may be used to convert the Nessus plugins list 410 into XML.

The resulting plugins.xml 420 may then be processed against a conditions.xsl stylesheet 424. This stylesheet 424 may be produced manually through researching the plugin information, e.g., consulting the relevant data in a vulnerability/exploit database. As discussed earlier in this section, it is difficult to totally automate this manual step. The processing against conditions.xsl 424 may insert the preconditions and postconditions developed through this exploit-modeling process. Finally, the resulting exploits.xml 426 may be transformed into Java modules and compiled into the TVA analysis engine. This process may also generate the Nessus identification cross-reference file 430 (nidxref.xsl) described earlier, which is in turn may be used to generate TVA network descriptions from Nessus scans.

Network Attack Analysis: Given a particular WA model (network description and set of exploits), the model may be analyzed to discover attack paths to critical network resources. From these attack paths one may then derive an expression for network safety in terms of the initial configuration. This safety expression in turn supports decisions about hardening the network against attacks.

We begin with a set of exploits $S=\{s_1, s_2, \ldots\}$ in terms of security conditions $A=\{a_1, a_2, \ldots\}$. These exploits and conditions conform to the modeling framework described earlier. The network attack model (network conditions and exploits) can be built by hand, automatically generated, or a combination of both.

The computed attack paths may be based on a directed graph of the dependencies (via preconditions and postconditions) among exploits and conditions. One way is to represent conditions as graph vertices and exploits as (labeled) graph edges. The dual of this representation is also possible, with exploits as graph vertices and conditions as labeled graph edges.

A third representation that is a bit more flexible may be employed. This representation has both conditions and exploits as vertices. Edge labels then become unnecessary, with directed edges simply representing generic dependency. In this representation, a dependency edge $e=(a, s)$ going from condition a to exploit s means that s depends on a, i.e., a is a precondition of s. Similarly, a dependency edge $e=(s, a)$ going from exploit s to condition a means that a depends on s, i.e., a is a postcondition of s.

The dependency graph may be built through a multi-step process. The set of all exploits $S_{exec} \cup S$ that can be successfully executed by the attacker may be built. Working from $S_{exec}$, a dependency graph $D_{init}$ starting from the initial condition exploit $s_{init}$ may be built. That is, starting from $s_{init}$ search $S_{exec}$ for exploits whose preconditions match the postconditions of $s_{init}$ add exploit dependencies for any $S_{found}$ found, and then remove $S_{found}$ from $S_{exec}$. Continue by iteratively adding dependencies to $D_{init}$ by searching $S_{exec}$ and removing $S_{found}$ from $S_{exec}$. The resulting graph $D_{init}$ represents forward dependencies from $s_{init}$, i.e., exploits in $D_{init}$ are those that are forward-reachable from $s_{init}$.

Next, do a backward traversal of the forward-reachable dependency graph $D_{init}$ starting from the attack goal exploit $s_{goal}$. The resulting dependency graph D includes exploits that are not only reachable from the initial conditions, but are also relevant to (i.e., reachable from) the attack goal. In fact, D comprises the necessary and sufficient set of exploits with respect to the initial and goal conditions, i.e., all exploits can be executed, and all exploits contribute to the attack goal. Thus D represents the set of minimal attack paths, in which no exploit can be removed without impacting the overall attack.

Given a dependency graph D, an expression may be constructed that concisely represents all possible attack paths. This construction involves the recursive algebraic substitution of exploits (via precondition/postcondition dependencies) in the backward direction, starting from the goal-condition exploit $s_{goal}$. That is, starting from $s_{goal}$ and algebraically substitute it with the conjunction of its preconditions, i.e. $s_{goal} \rightarrow \{a_{goal_1}, a_{goal_2}, \ldots, a_{goal_i}\}$.

Then, substitute each of the goal-condition preconditions $a_{goal_i}$ with the exploit that yields it as a postcondition, since these are logically equivalent. In the event that more than one exploit yields this postcondition, the disjunction of all such exploits may be formed, since logically any one of them could provide the postcondition independent of the others.

Continuing in a recursive fashion, substitute the newly generated exploit expressions in the same way the goal-condition exploit expression was treated. In doing this recursive algebraic substitution, it is possible to make direct use of the exploit-condition dependency graph by traversing it breadth first. Once the dependency graph has been fully traversed, the result should be a concise expression that represents all possible attack paths to the goal.

Initial-condition assignments of false mean that the corresponding network services are unavailable. It is desirable to choose assignments with minimal impact on network services. One assignment can immediately be chosen over another if all of its disabled services also appear disabled in the other set. This choice is desirable because the selected set represents a comparative increase in available services. Moreover, this choice is neutral with respect to relative priorities of network services, since no service is disabled in the chosen set in comparison to the other.

This analysis should yield all possible hardening measures (sets of initial-condition assignments) that have minimal impact on services. The analyst can now compare the various sets and select the one that offers the best combination of offered services.

Example TVA Application: This section demonstrates by example how TVA combines vulnerabilities in a network to find attack paths to a particular goal. The TVA results are then analyzed to determine the best way to harden the network against attack.

Figure 5:
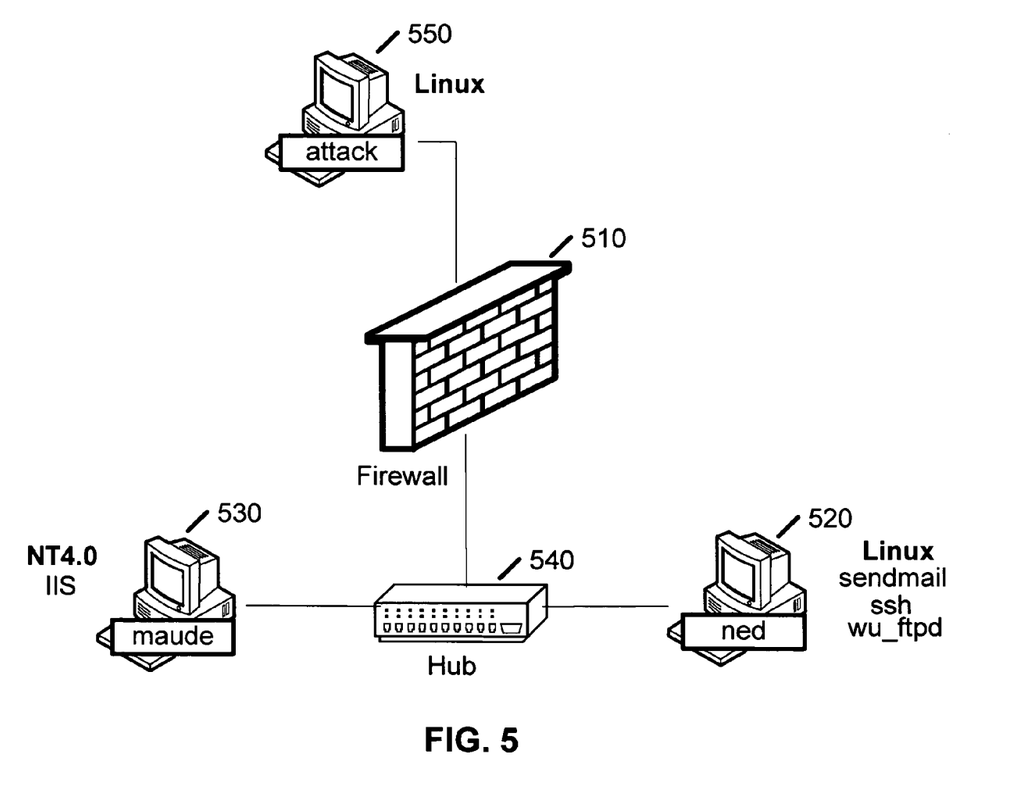
FIG. 5 shows a network diagram for an example topological vulnerability analysis application.

In this example, a restrictive firewall 510 protects the machines 520 & 530 that support public web and email services, as shown in FIG. 5. This example shows how connectivity-limiting devices affect the TVA model and how vulnerable services on a network can be exploited even when direct access to services is blocked.

The firewall 510 implements the following policy to restrict connectivity from the attack machine 550:

1. Incoming ssh traffic is permitted to both maude 530 and ned 520, although only ned 520 is running the service (this is a common practice under the assumption that it is safe because ssh is a secure protocol);
2. Incoming web traffic is permitted only to maude 530, which is running Microsoft's Internet Information Server (IIS);
3. Incoming email is permitted to ned 520, which is running the sendmail server;
4. Incoming File Transfer Protocol (FTP) traffic is blocked because ned 520 is running the wu_ftpd server, which has a history of vulnerabilities;

5. All outgoing traffic is permitted (this is a common practice under the assumption that outgoing traffic won't harm the internal network).

The attack goal for this example is to obtain super user (root) access on ned 520. This is not directly possible because (1) no known exploits exist for the version of sendmail running on ned 520, and (2) the firewall 510 blocks access to the vulnerable wu_ftpd service from the attack machine 550. The question now is whether the attack goal can be realized indirectly, i.e., through a sequence of multiple exploits.

The initial locus of attack is on the attack machine 550, since only that machine has user access and privilege defined as an initial condition, via the WA network description. In general, the initial attack machine 550 will also tend to have a complete set of programs used by the exploits in the model. Network connectivity is represented at the machine level by listing all possible connections from the given machine to all other destination machines in the network description. The effect of a firewall or other connectivity-limiting device is to reduce the size of each machine's connectivity table, but such devices generally will not appear as specific machines in the network description unless they run their own services to which other machines can connect. For this scenario, the firewall 510 did not support any such services.

The attack goal is represented in the network description as a particular set of resources on a particular machine (the goal machine could appear elsewhere in the network description, with any set of initial conditions defined for it). In this example, there was only testing for whether execute access (the ability to run programs) with super user (root) privilege can be obtained on ned 520. However, in general it is possible to test any other conditions, such as the appearance of any new connectivity or program in its configuration.

Figure 6:
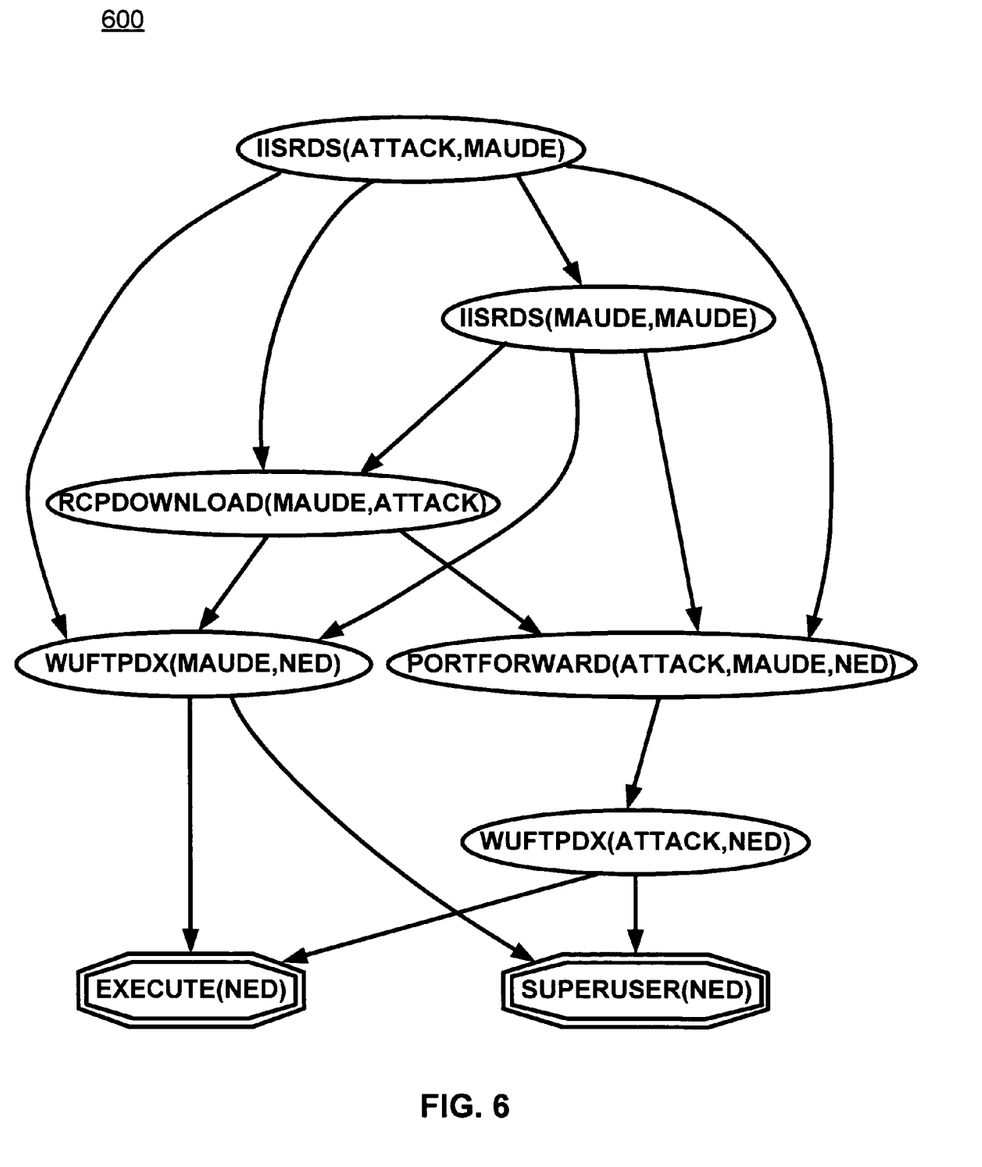
FIG. 6 shows an attack graph for an example topological vulnerability analysis application.
Figure 11:
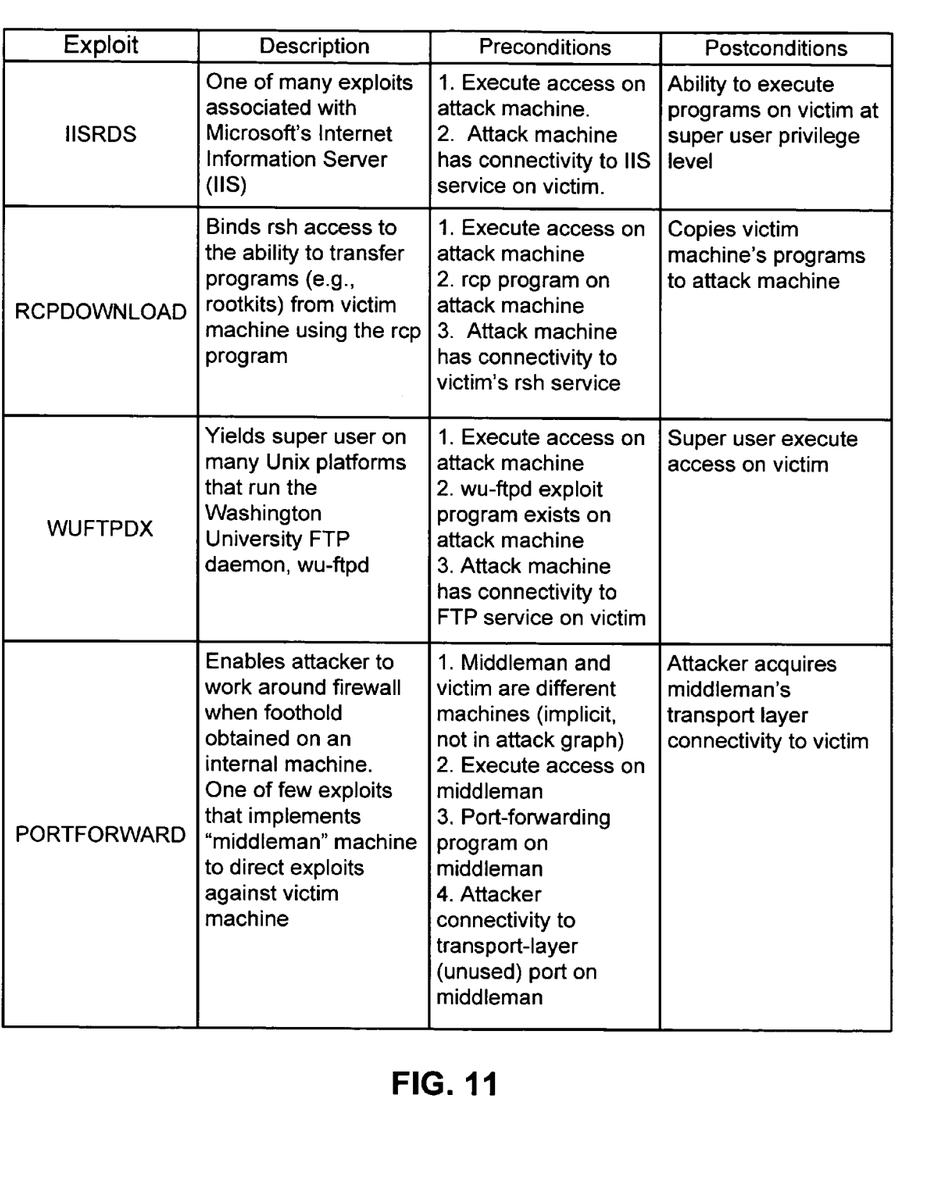
FIG. 11 is a table of exploits for an example topological vulnerability analysis application.

FIG. 6 shows the resulting TVA attack graph 600 for this example. For clarity, the specific exploit preconditions and postconditions are omitted from the figure, but they are described in a table on FIG. 11. Despite the firewall policy designed to protect it, the external attacker obtains execute access with super user privilege on ned 520. The attack graph 600 shows that the initial exploitation of the IIS vulnerability on maude 530 ultimately leads to the compromise of ned 520, e.g., the following:

1. The IIS Remote Data Services (RDS) exploit enables the attacker to execute programs on maude 530;
2. Given the access provided by the IIS RDS exploit, the remote copy (rcp) program on maude 530 is executed to download a rootkit from the attack machine;
3. A port-forwarding program from the rootkit is then executed to set up access from the attack machine through maude 530 to the FTP service on ned 520;
4. Finally, the wu_ftpd exploit is executed through the forwarded connection against ned 520 to obtain root access there.

Finding such attack paths is a unique TVA capability. No commercial tool connected outside the firewall 510 is currently capable of reporting more than an IIS vulnerability on maude 530. Connected inside the firewall 510, a commercial tool would also report the vulnerable wu_ftpd service, but human analysis may still be required to build an attack path from the outside through maude 530 to ned 520. This would be an easy enough exercise for an experienced penetration tester working on such a small network. But it would be infeasible for networks in which voluminous outputs must be analyzed manually for large numbers of machines.

From a NA attack graph, an expression may immediately be computed for the attack-goal conditions in terms of the initial conditions. This process involves traversing the attack graph in a backwards direction, algebraically substituting exploits with those exploits that satisfy their preconditions. This computation is preferably done recursively, with the recursion ending when an exploit's precondition is an initial condition.

As we explained earlier, the only conditions relevant to network hardening are the initial conditions. An expression $g(c_1, c_2, \ldots, c_k)$ for the attack goal in terms of initial conditions $C_{init} = \{c_1, c_2, \ldots c_k\}$ then provides a way to determine if a particular network configuration is guaranteed safe with respect to the attack goal. From the particular form of $g$, safe assignments of $A_{init}$ may be determined.

FIG. 7 again shows the TVA attack graph for this example, this time with the initial conditions included. For convenience, the figure includes algebraic symbols that correspond to our analysis of network hardening. In particular, exploits are denoted by Greek letters, and initial conditions are denoted by $c_i$.

Figure 7:
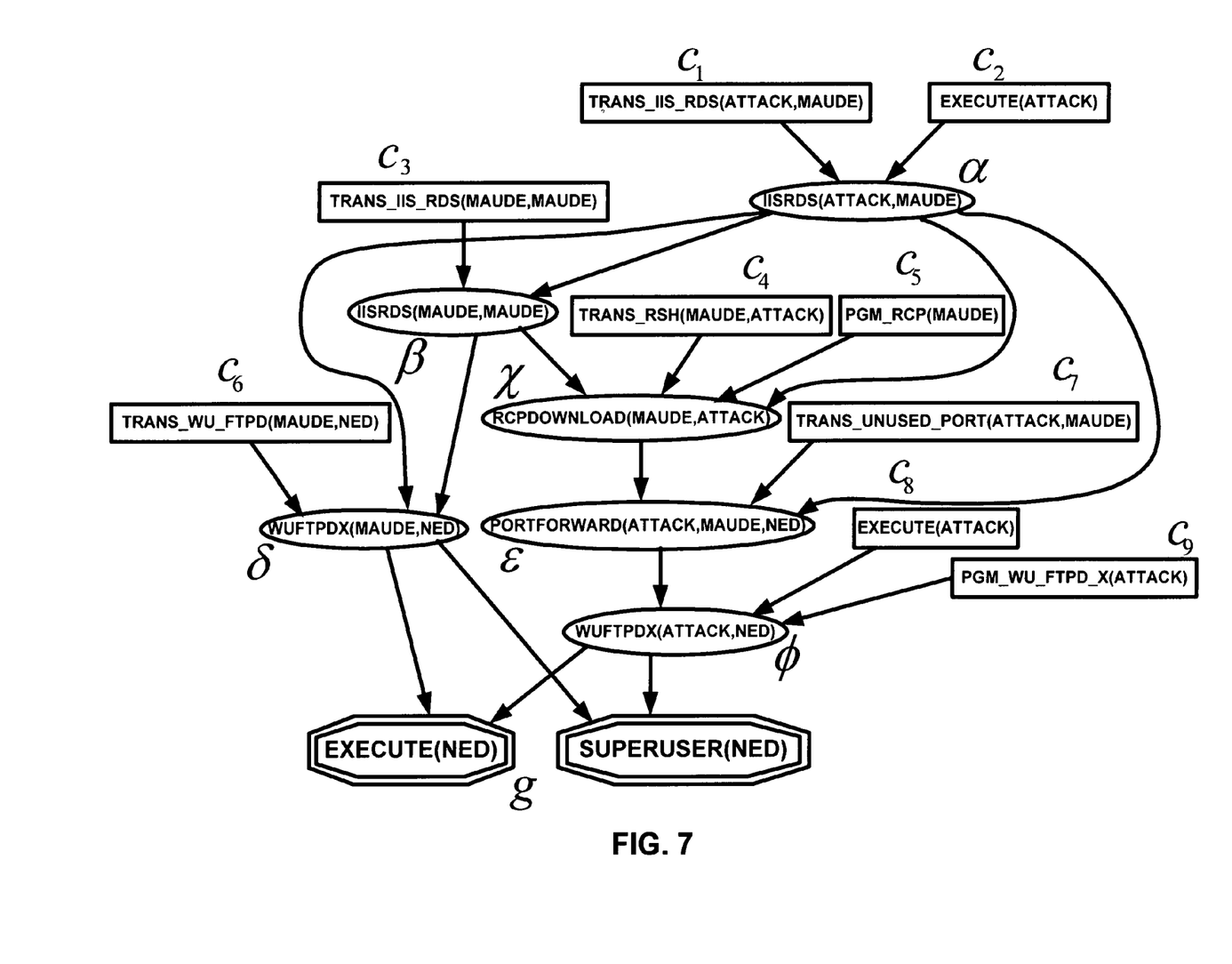
FIG. 7 shows additional details for the example attack graph shown in FIG. 6.

By examining FIG. 7, we can traverse the attack graph backwards, starting from the goal condition g, and recursively perform algebraic substitution according to precondition/postcondition dependencies.

$$g = \delta + \phi \quad (1)$$
$$= (\alpha + \beta)\chi c_6 + \varepsilon c_8 c_9$$
$$= (\alpha + \alpha c_3)\chi c_6 + (\alpha + \beta)\chi c_7 c_8 c_9$$
$$= \alpha(\alpha + \beta)c_4 c_5 c_6 + \alpha(\alpha + \beta)c_4 c_5 c_7 c_8 c_9$$
$$= \alpha c_4 c_5 c_6 + \alpha c_4 c_5 c_7 c_8 c_9$$
$$= c_1 c_2 c_4 c_5 c_6 + c_1 c_2 c_4 c_5 c_7 c_8 c_9$$
$$= c_1 c_2 c_4 c_5 (c_6 + c_7 c_8 c_9)$$

In terms of the problem domain, some initial conditions may be outside the network administrator's control. In particular, the administrator may have no control over conditions like programs and user access/privilege on the attacker's machine. Thus $c_2 = c_8 = c_9 = 1$, so that Eq. (1) becomes $$g = c_1 c_4 c_5 (c_6 + c_7) \quad (2)$$

From Eq. (2), four assignments of initial conditions are apparent that provide network safety. While other safe assignments are also possible, these four minimize the cost of hardening the example network:

1. Patch or disable the IIS RDS web server on maude ($c_1 = 0$);
2. Disable outgoing rsh from maude ($c_4 = 0$);
3. Remove the rcp program from maude ($c_5 = 0$);
4. Patch or disable wu_ftpd from maude to ned, and block all unused ports on maude ($c_6 + c_7 = 0$).

When considered separately, each of these four options has a minimal hardening cost, in the sense that no hardening measure can be ignored without jeopardizing the attack goal. The network administrator can then choose the option that has overall minimum cost, based on the relative costs of the individual hardening measures.

Technical Challenges: The TVA modeling framework supports the full range of network and exploit information needed for realistic scenarios. But to make TVA feasible for large networks, automatic model generation methods may be needed.

As described earlier, TVA network descriptions may be created using vulnerability scanners such as that from Nessus. But, some vulnerability scanners such as the one by Nessus may lack the ability to provide certain types of information. For example, with Nessus, one may have to assume that firewalls enforce generic policies for the individual network segments. Although this may be an acceptable approximation of firewall effects, real policies often include host-specific rules.

While host-specific rules could be handled by individual Nessus scans from each machine in the network, this procedure may not be very efficient. A more efficient solution may be to build TVA models directly from firewall filter tables. Also, while transport and application layer information may be available from vulnerability scanners, additional topology information may be desired to help delineate between the link and network TCP/IP layers.

Although some vulnerability scanners can guess a remote machine's operating system, it is not always correct and often cannot determine a specific version. Many exploits depend on detailed information about the operating system. Vulnerabilities are often removed by applying a patch to the applicable operating system or application. Patch-level information may therefore be desirable to increase the accuracy of exploit modeling.

Vulnerability scanners often scan for vulnerabilities from a remote location, so they may only be able to detect network service information. However, many vulnerabilities are local and are not exploitable or detectable over a network. It may be desirable to add processes to gather program-specific information from individual hosts, e.g., from host configuration files. For example, some trust relationship and group membership information is difficult to obtain remotely. This information is valuable for TVA, to determine whether an exploit is really possible or whether it affects machines other than the immediate target.

As one can imagine, TVA attack graphs might become huge for large, poorly secured networks. Analytical and visual methods are necessary for handling such (quadratic) attack-graph complexity, such as aggregating parts of the graph as summary information or culling parts of the graph not of immediate interest. A drill-down visualization tool may be helpful for helping with attack graph management problems.

TVA has potential application beyond penetration testing and network hardening. For example, it can be applied to the tuning of intrusion detection systems. In practice, network administrators must often balance the risk of attack against the need to offer services. Even with network hardening guided by TVA, administrators may still decide to tolerate some residual network vulnerability from services they absolutely need. The intrusion detection system could be configured to consider only this residual vulnerability and thus generate alarms only in the context of genuine threats to critical network resources.

At a minimum, vulnerabilities that do not significantly contribute to overall risk can be ignored, reducing the effective false-positive rate. It may also be possible to infer new intrusion signatures from TVA results, in turn increasing the number of true positive detections.

But there is a limit to what can be accomplished with network hardening and intrusion detection. The need to offer services is at odds with network hardening, and effective intrusion detection will remain challenging, particularly in the face of novel attacks.

To augment methods of avoidance and detection, TVA can be applied to attack response, both defensive and offensive. For defensive response, the network is dynamically hardened in the face of attacks. A less conservative approach is to launch an offensive counterattack in response to an attack against one's own network. While approach may be extreme, it could be the only available option for allowing a network to function after being attacked.

Review: Described is a tool for Topological Vulnerability Analysis (TVA), a powerful approach to global network vulnerability analysis. The tool analyzes dependencies among modeled attacker exploits, in terms of attack paths (sequences of exploits) to specific network targets. While the current generation of commercial vulnerability scanners generates voluminous information on vulnerabilities considered in isolation, they give little clues as to how attackers might combine them to advance an attack.

The tool automates the type of labor-intensive analysis usually performed by penetration-testing experts, providing a thorough understanding of the vulnerabilities of critical network resources. It encourages inexpensive what-if analyses of the impact of candidate network configurations on overall network security.

Also, the tool employs a comprehensive database of known vulnerabilities and attack techniques. This database includes a comprehensive rule base of exploits, with vulnerabilities and other network security conditions serving as exploit preconditions and postconditions.

During TVA network discovery, network vulnerability information is gathered and correlated with exploit rules via the open-source Nessus vulnerability scanner. A TVA analysis engine then models network attack behavior based on the exploit rules, building a graph of precondition/postcondition dependencies. This graph provides attack paths leading from the initial network state to a specified goal state. From the attack graph, we can determine safe network configurations with respect to the goal, including those that maximize available network services.

The TVA tool provides powerful new capabilities for network vulnerability analysis. It enables network administrators to choose network configurations that are provably secure and minimize the cost of network hardening. TVA also has potential application to other key areas of network security, such as identifying possible attack responses and tuning intrusion detection systems.

Figure 8:
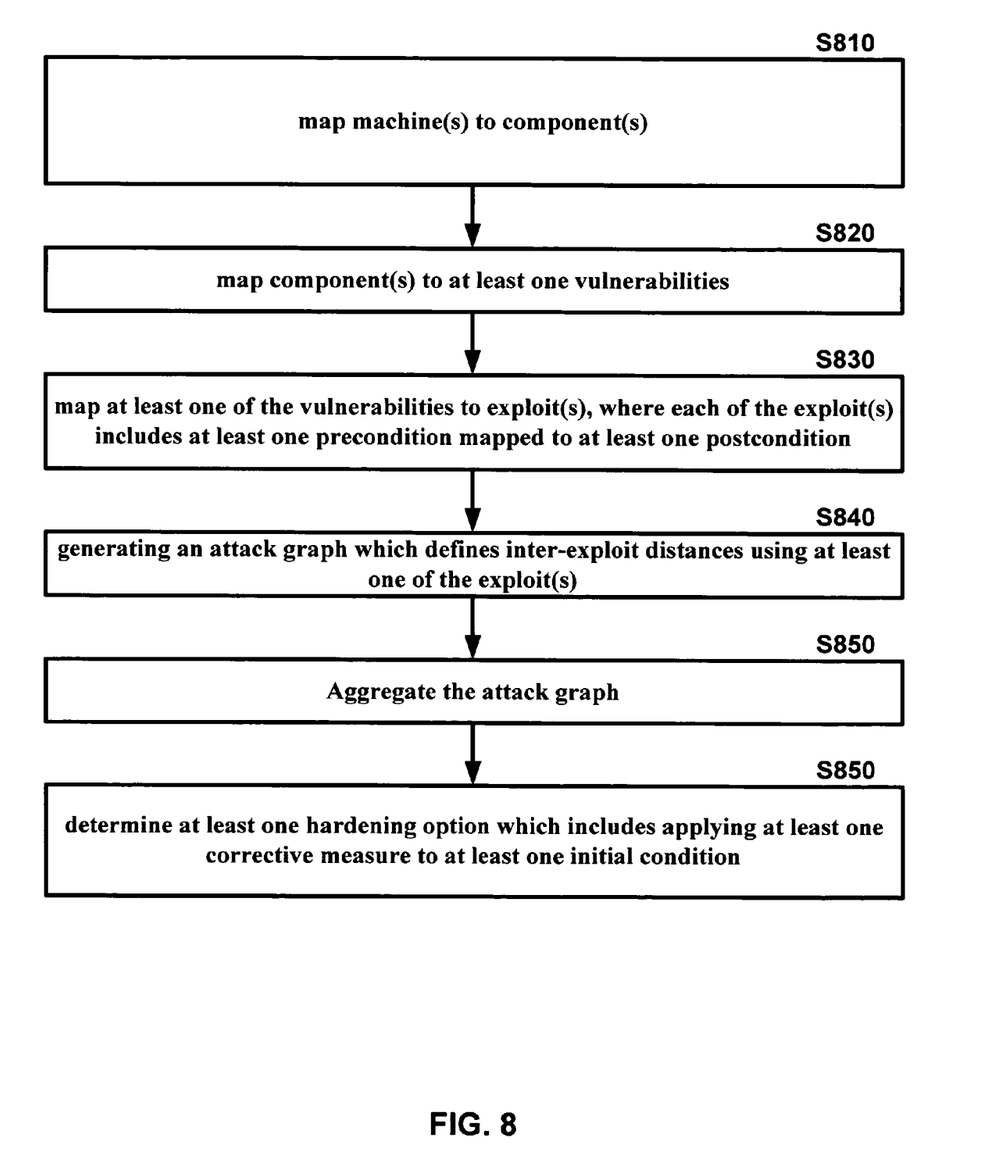
FIG. 8 is a flow diagram of an aspect of an embodiment of the present invention.
Figure 9:
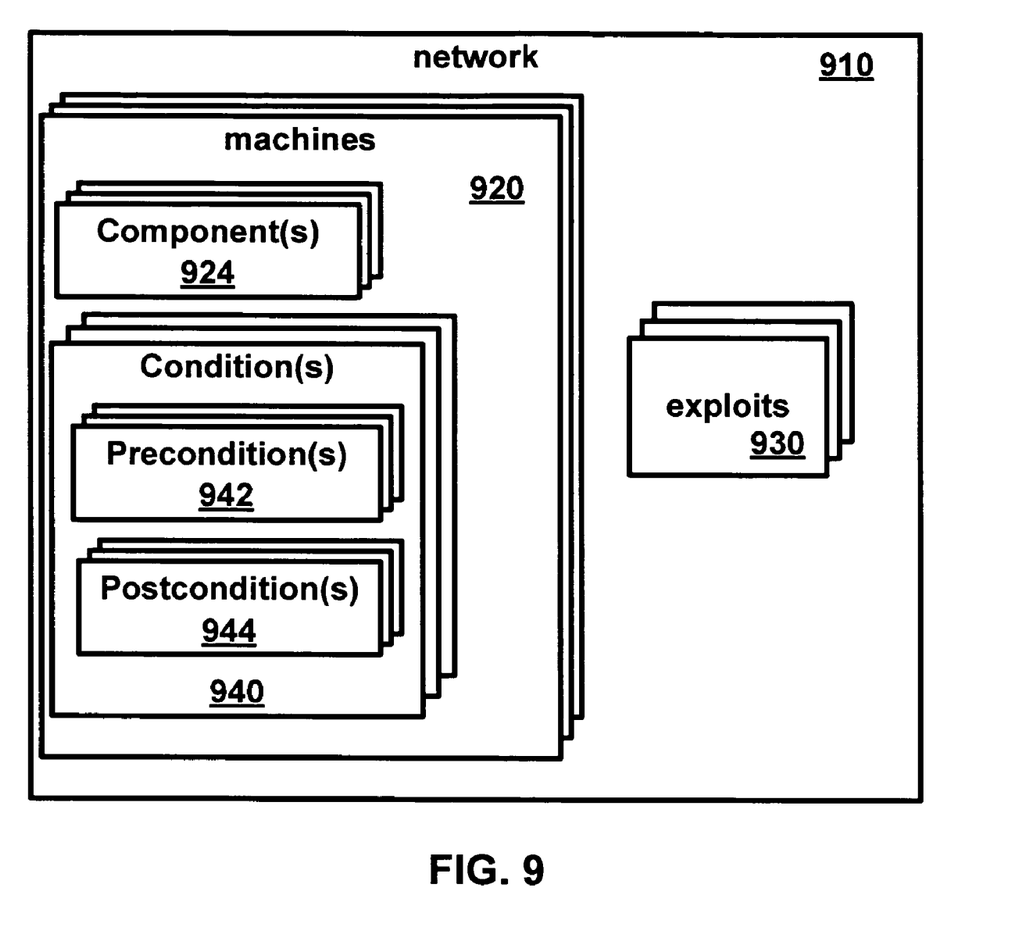
FIG. 9 is a block diagram of a network as per an aspect of an embodiment of the present invention.

The embodiments and aspects of the present invention may be embodied on a tangible computer readable medium or other computer readable media containing computer programs that when executed by one or more processors, can cause the processors to complete a series of steps to model, analyze, and respond to network attacks. This can be seen on FIGS. 8, 9, and 10. FIG. 9 is a block diagram showing network elements used to model, analyze, and respond to network attacks. As shown, a network 910 may include a series of machines 920 that are interconnected. Each of the machines may have executable components 924. A component is any unit of computational processing that can contribute to a network attack vulnerability. Each of the machines 920 may have conditions 940 such as preconditions 942 and post conditions 944. Additionally the network may have exploits 930.

Figure 10:
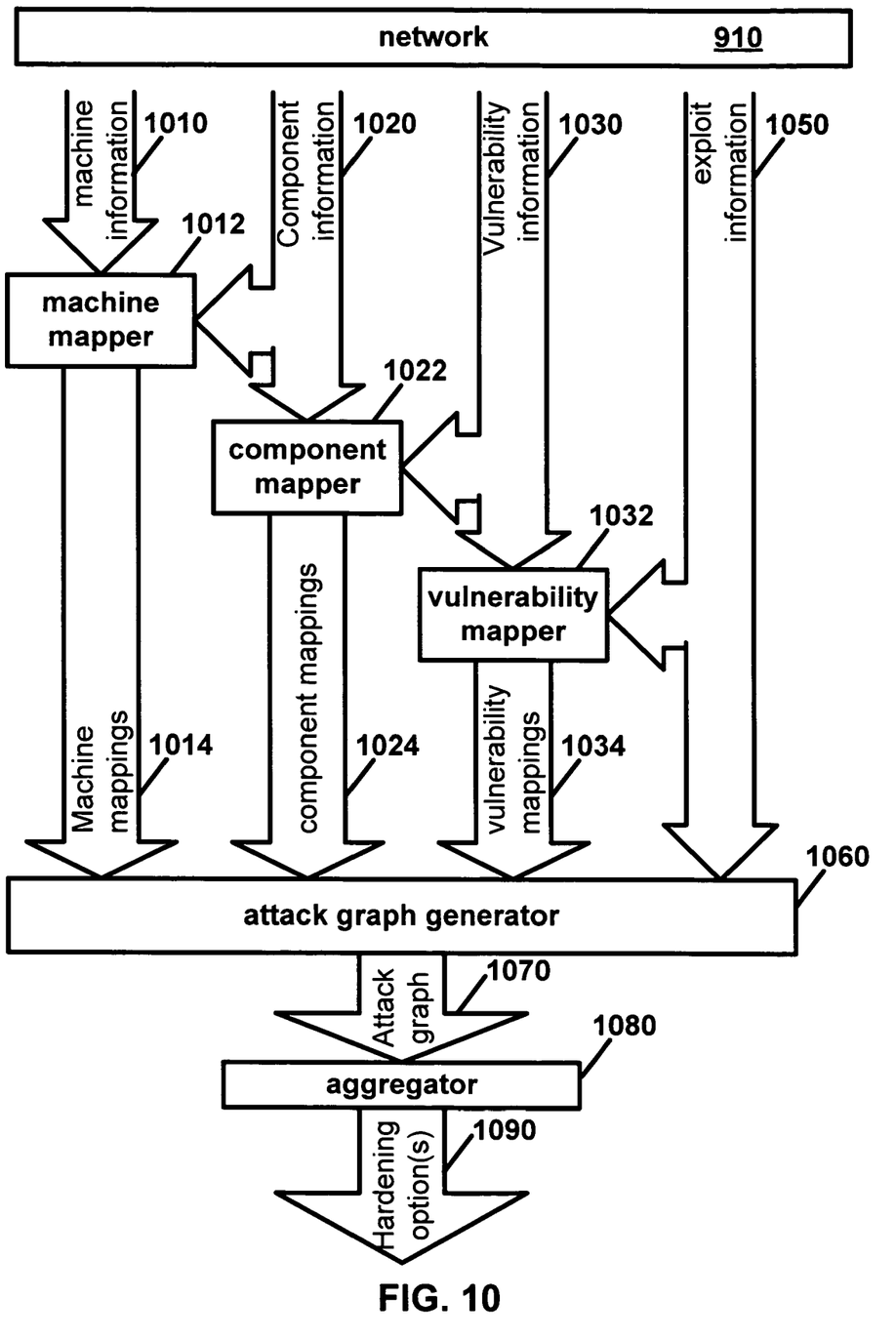
FIG. 10 is a block diagram of an aspect of an embodiment of the present invention.

The program can map at least one machine to at least one component at S810 using network 910 machine information 1010 using a module such as a machine mapper 1012. The result may be a set of machine mappings 1014. The mapping of machines to components may include at least one application of at least one corrective measure on a selective basis.

A component mapper 1022 may use network 910 component information 1020 to map at least one of the components to at least one vulnerability (S820). The result may be a set of component mappings 1024.

At S830, at least one vulnerability" may be mapped to at least one of a multitude of exploits. Each of the "multitude of exploits" should include at least one precondition mapped to at least one postcondition. This may be done using a vulnerability mapper module 1032 using vulnerability information 1030 to generate vulnerability mappings 1034.

An attack graph 1070 may be generated using at least one of the exploits 1050 using an attack graph generating module 1060 (S840). The attack graph should define inter-exploit distances. An aggregation process 1080 may be performed upon the attack graph 1070 (S850). Hardening options 1090 may be determined using the aggregated attack graph. Similarly, hardening options 1090 could also be determined using the non-aggregated attack graph. The hardening option(s) will likely include applying at least one corrective measure to at least one initial condition, where the "initial condition" is the initial state of at least one of the preconditions.

In some embodiments of the present invention, the generation of an attack graph and the performing of an aggregation process may be performed simultaneously.

Generating a visual representation of at least one part of the attack graph may be useful in understanding how the health of the network. Manual intervention may be performed using the visual representation. Additionally, it may be advantageous to cull the attack graph.

The invention as described may be practiced with additional steps. For example, an addition step may be to monitor for intrusion event(s). In particular, one may wan to monitor for intrusion events associated with at least one of the exploits. Yet a further step that may be implemented in accordance with the present invention would be to correlate at least one of the intrusion event(s) to detect a coordinated attack. Then, remedial responses may be taken to stop subsequent network intrusions.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications in form and detail as are suited to the particular use contemplated without departing from the spirit and scope of the present invention. In fact, after reading the above description, it will be apparent to one skilled in the relevant art(s) how to implement the invention in alternative embodiments. Thus, the present invention should not be limited by any of the above described example embodiments. In particular, it should be noted that, for example purposes, the above explanation utilizes modules. One skilled in the art will recognize that above described modules may be implemented in many ways including as software modules written in many different computer languages such as assembly language, JAVA, or C. Similarly, the modules could be implemented as hardware using ASICs, PALs or other equivalent devices.

In addition, it should be understood that any figures, graphs, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A non-transitory computer readable medium containing a computer program that when executed by one or more processors, causes the one or more processors to perform the steps of:
   a) mapping at least one machine to at least one component;
   b) mapping at least one of said at least one component to at least one vulnerability;
   c) mapping at least one of said at least one vulnerability to at least one of a multitude of exploits, each of said multitude of exploits including at least one precondition mapped to at least one postcondition;
   d) generating an attack graph using at least one of said multitude of exploits, said attack graph defining inter-exploit distances;
   e) performing an aggregation process upon said attack graph including collapsing non-overlapping subgraphs to provide compression; and
   f) determining at least one hardening option using each of said at least one hardening option including applying at least one corrective measure to at least one initial condition, said initial condition being the initial state of at least one of said at least one precondition.

2. A computer readable medium according to claim 1, further including the step of taking a remedial responsive measure to stop subsequent network intrusions.

3. A computer readable medium according to claim 1, wherein at least one of said at least one component is any unit of computational processing that can contributes to a network attack vulnerability.

4. A computer readable medium according to claim 1, wherein said step of mapping at least one machine to at least one component includes at least one application of at least one corrective measure on a selective basis.

5. A computer readable medium according to claim 1, wherein said step of generating an attack graph and said step of performing an aggregation process are performed simultaneously.

6. A computer readable medium according to claim 1, further including the step of generating a visual representation of at least one part of said attack graph.

7. A computer readable medium according to claim 6, wherein manual intervention is performed using said visual representation.

8. A computer readable medium according to claim 1, further including culling said attack graph.

9. A computer readable medium according to claim 1, further including the step of monitoring for at least one intrusion events, at least one of said at least one intrusion events associated with at least one of said multitude of exploits.

10. A computer readable medium according to claim 9, further including the step of correlating at least one of said at least one intrusion event to detect at least one coordinated attack.

11. A non-transitory computer readable medium containing a computer program comprising:
  a) a machine mapper, configured to map at least one machine to at least one component;
  b) a component mapper, configured to map at least one of said at least one component to at least one vulnerability;
  c) a vulnerability mapper configured to map at least one of said at least one vulnerability to at least one of a multitude of exploits, each of said multitude of exploits including at least one precondition mapped to at least one postcondition;
  d) an attack graph generator configured to generate an attack graph using at least one of said multitude of exploits, said attack graph defining inter-exploit distances;
  e) an aggregator configured to perform an aggregation process upon said attack graph including collapsing non-overlapping subgraphs to provide compression; and
  f) a hardener configured to determine at least one hardening option using each of said at least one hardening option configured to apply at least one corrective measure to at least one initial condition, said initial condition being the initial state of at least one of said at least one precondition.

12. A non-transitory computer readable medium according to claim 11, further including a responder configured to take a remedial responsive measure to stop subsequent network intrusions.

13. A non-transitory computer readable medium according to claim 11, wherein at least one of said at least one component is any unit of computational processing that contributes to a network attack vulnerability.

14. A non-transitory computer readable medium according to claim 11, wherein said machine mapper is additionally configured to apply of at least one corrective measure on a selective basis.

15. A non-transitory computer readable medium according to claim 11, wherein said attack graph generator and said aggregator operate simultaneously.

16. A non-transitory computer readable medium according to claim 11, further including a visual representation generator configured to generate a visual representation of at least one part of said attack graph.

17. A non-transitory computer readable medium according to claim 16, wherein manual intervention is performed using said visual representation.

18. A non-transitory computer readable medium according to claim 11, further including a culler configured to cull said attack graph.

19. A non-transitory computer readable medium according to claim 11, further including an intrusion monitor configured to monitor for at least one intrusion event, at least one of said at least one intrusion event associated with at least one of said multitude of exploits.

20. A non-transitory computer readable medium according to claim 19, further including a correlator configured to correlate at least one of said at least one intrusion event to detect at least one coordinated attack.

* * * * *